United States Patent
McGlaughlin

(10) Patent No.: US 7,340,167 B2
(45) Date of Patent: Mar. 4, 2008

(54) FIBRE CHANNEL TRANSPARENT SWITCH FOR MIXED SWITCH FABRICS

(75) Inventor: Edward C McGlaughlin, Minneapolis, MN (US)

(73) Assignee: QLOGIC, Corporation, Aliso Viejo, CA (US)

( * ) Notice: Subject to any disclaimer, the term of this patent is extended or adjusted under 35 U.S.C. 154(b) by 471 days.

(21) Appl. No.: 10/961,463

(22) Filed: Oct. 8, 2004

(65) Prior Publication Data
US 2005/0238353 A1 Oct. 27, 2005

(51) Int. Cl.
- H04J 14/00 (2006.01)
- G06F 15/173 (2006.01)
- G06F 13/00 (2006.01)
- H04L 12/28 (2006.01)

(52) U.S. Cl. .................. 398/45; 709/229; 709/244; 709/245; 710/316; 710/317; 710/240; 370/351; 370/398; 370/401

(58) Field of Classification Search ............ 398/45–54; 370/351–419; 710/2, 240, 316, 317; 702/182; 379/133; 709/229, 244
See application file for complete search history.

(56) References Cited

U.S. PATENT DOCUMENTS

| | | | |
|---|---|---|---|
| 4,162,375 A | 7/1979 | Schlichte | 179/15 |
| 4,200,929 A | 4/1980 | Davidjuk et al. | |
| 4,382,159 A | 5/1983 | Bowditch | |
| 4,425,640 A | 1/1984 | Philip et al. | 370/58 |
| 4,546,468 A | 10/1985 | Christmas et al. | 370/54 |
| 4,569,043 A | 2/1986 | Simmons et al. | 370/63 |
| 4,725,835 A | 2/1988 | Schreiner et al. | 340/825.83 |
| 4,821,034 A | 4/1989 | Anderson et al. | 370/825 |
| 4,980,857 A | 12/1990 | Walter et al. | |
| 5,051,742 A | 9/1991 | Hullett et al. | |
| 5,115,430 A | 5/1992 | Hahne et al. | |

(Continued)

FOREIGN PATENT DOCUMENTS

EP 0649098 9/1994

(Continued)

OTHER PUBLICATIONS

Examination Report from the European Patent Office dated Oct. 12, 2007 for European Application No. 05 805 632.6.

(Continued)

*Primary Examiner*—Kenneth Vanderpuye
*Assistant Examiner*—Li Liu
(74) *Attorney, Agent, or Firm*—Klein, O'Neill & Singh, LLP; T J Singh

(57) ABSTRACT

A method and a Fibre Channel switch element are provided that allows communication between a host system and a target device attached to a proprietary switch fabric in a network. The Fibre Channel switch element includes a first port that communicates with the target device through the proprietary switch fabric by logging on behalf of the host system so that the proprietary switch behaves as if it was directly communicating with the host system; and a second port that communicates with the host system and collects host bus adapter ("HBA") identification information, wherein the HBA identification information is used to map the first port to the second port so that when the host system communicates with the target device the Fibre Channel switch element is transparent to the proprietary switch fabric.

12 Claims, 11 Drawing Sheets

U.S. PATENT DOCUMENTS

| | | | |
|---|---|---|---|
| 5,144,622 A | 9/1992 | Takiyasu et al. | 370/85.13 |
| 5,367,520 A | 11/1994 | Cordell | 370/60 |
| 5,590,125 A | 12/1996 | Acampora et al. | |
| 5,598,541 A | 1/1997 | Malladi | 395/286 |
| 5,610,745 A | 3/1997 | Bennett | 359/139 |
| 5,623,492 A | 4/1997 | Teraslinna | |
| 5,666,483 A | 9/1997 | McClary | |
| 5,687,172 A | 11/1997 | Cloonan et al. | 370/395 |
| 5,701,416 A | 12/1997 | Thorson et al. | |
| 5,706,279 A | 1/1998 | Teraslinna | |
| 5,748,612 A | 5/1998 | Stoevhase et al. | 370/230 |
| 5,812,525 A | 9/1998 | Teraslinna | |
| 5,818,842 A | 10/1998 | Burwell et al. | 370/397 |
| 5,821,875 A | 10/1998 | Lee et al. | |
| 5,828,475 A * | 10/1998 | Bennett et al. | 398/52 |
| 5,835,752 A | 11/1998 | Chiang et al. | |
| 5,894,560 A | 4/1999 | Carmichael et al. | |
| 5,954,796 A | 9/1999 | McCarty et al. | |
| 5,978,359 A | 11/1999 | Caldara et al. | |
| 5,987,028 A | 11/1999 | Yang et al. | 370/380 |
| 5,999,528 A | 12/1999 | Chow et al. | 370/365 |
| 6,014,383 A | 1/2000 | McCarty | 370/453 |
| 6,021,128 A | 2/2000 | Hosoya et al. | 370/380 |
| 6,026,092 A | 2/2000 | Abu-Amara et al. | |
| 6,031,842 A * | 2/2000 | Trevitt et al. | 370/412 |
| 6,047,323 A | 4/2000 | Krause | 709/227 |
| 6,055,618 A | 4/2000 | Thorson | |
| 6,061,360 A | 5/2000 | Miller et al. | |
| 6,081,512 A | 6/2000 | Muller et al. | 370/256 |
| 6,108,738 A | 8/2000 | Chambers et al. | |
| 6,108,778 A | 8/2000 | LaBerge | |
| 6,118,776 A * | 9/2000 | Berman | 370/351 |
| 6,128,292 A | 10/2000 | Kim et al. | 370/356 |
| 6,144,668 A | 11/2000 | Bass et al. | |
| 6,160,813 A | 12/2000 | Banks et al. | 370/422 |
| 6,201,787 B1 | 3/2001 | Baldwin et al. | |
| 6,229,822 B1 | 5/2001 | Chow et al. | |
| 6,240,096 B1 * | 5/2001 | Book | 370/412 |
| 6,253,267 B1 | 6/2001 | Kim et al. | |
| 6,289,002 B1 | 9/2001 | Henson et al. | |
| 6,308,220 B1 | 10/2001 | Mathur | 709/238 |
| 6,324,181 B1 | 11/2001 | Wong et al. | 370/403 |
| 6,330,236 B1 | 12/2001 | Ofek et al. | 370/369 |
| 6,353,612 B1 | 3/2002 | Zhu et al. | |
| 6,370,605 B1 | 4/2002 | Chong | |
| 6,401,128 B1 | 6/2002 | Stai et al. | |
| 6,411,599 B1 | 6/2002 | Blanc et al. | 370/219 |
| 6,411,627 B1 | 6/2002 | Hullett et al. | |
| 6,418,477 B1 | 7/2002 | Verma | |
| 6,421,711 B1 | 7/2002 | Blumenau et al. | |
| 6,424,658 B1 | 7/2002 | Mathur | 370/429 |
| 6,449,274 B1 | 9/2002 | Holden et al. | 370/392 |
| 6,452,915 B1 | 9/2002 | Jorgensen | |
| 6,467,008 B1 | 10/2002 | Gentry, Jr. et al. | 710/261 |
| 6,470,026 B1 | 10/2002 | Pearson et al. | |
| 6,532,212 B1 | 3/2003 | Soloway et al. | |
| 6,570,850 B1 | 5/2003 | Gutierrez et al. | |
| 6,594,231 B1 | 7/2003 | Byham et al. | |
| 6,597,691 B1 | 7/2003 | Anderson et al. | 370/360 |
| 6,597,777 B1 | 7/2003 | Ho | |
| 6,614,796 B1 | 9/2003 | Black et al. | |
| 6,697,359 B1 | 2/2004 | George | 370/357 |
| 6,697,368 B2 | 2/2004 | Chang et al. | |
| 6,718,497 B1 | 4/2004 | Whitby-Strevens | |
| 6,744,772 B1 | 6/2004 | Eneboe et al. | |
| 6,760,302 B1 | 7/2004 | Ellinas et al. | |
| 6,785,241 B1 | 8/2004 | Lu et al. | |
| 6,807,181 B1 * | 10/2004 | Weschler | 370/400 |
| 6,816,750 B1 | 11/2004 | Klaas | |
| 6,859,435 B1 | 2/2005 | Lee et al. | |
| 6,865,157 B1 | 3/2005 | Scott et al. | |
| 6,941,357 B2 | 9/2005 | Nguyen et al. | |
| 6,941,482 B2 | 9/2005 | Strong | |
| 6,952,659 B2 | 10/2005 | King et al. | |
| 6,968,463 B2 | 11/2005 | Pherson et al. | |
| 7,000,025 B1 | 2/2006 | Wilson | |
| 7,002,926 B1 | 2/2006 | Eneboe et al. | |
| 7,010,607 B1 | 3/2006 | Bunton | |
| 7,039,070 B2 | 5/2006 | Kawakatsu | |
| 7,039,870 B2 | 5/2006 | Takaoka et al. | |
| 7,047,326 B1 | 5/2006 | Crosbie et al. | |
| 7,050,392 B2 | 5/2006 | Valdevit | |
| 7,055,068 B2 | 5/2006 | Riedl | |
| 7,061,871 B2 | 6/2006 | Sheldon et al. | |
| 7,092,374 B1 | 8/2006 | Gubbi | |
| 7,110,394 B1 | 9/2006 | Chamdani et al. | |
| 7,124,169 B2 | 10/2006 | Shimozono et al. | |
| 7,151,778 B2 | 12/2006 | Zhu et al. | |
| 7,171,050 B2 | 1/2007 | Kim | |
| 7,185,062 B2 | 2/2007 | Lolayekar et al. | |
| 7,221,650 B1 | 2/2007 | Cooper et al. | |
| 7,194,538 B1 | 3/2007 | Rabe et al. | |
| 7,200,108 B2 | 4/2007 | Beer et al. | |
| 7,215,680 B2 | 5/2007 | Mullendore et al. | |
| 7,248,580 B2 | 7/2007 | George et al. | |
| 7,269,131 B2 | 9/2007 | Cashman et al. | |
| 2001/0011357 A1 | 8/2001 | Mori | |
| 2001/0038628 A1 | 11/2001 | Ofek et al. | 370/392 |
| 2002/0034178 A1 | 3/2002 | Schmidt et al. | |
| 2002/0103913 A1* | 8/2002 | Tawil et al. | 709/229 |
| 2002/0104039 A1 | 8/2002 | DeRolf et al. | |
| 2002/0124124 A1 | 9/2002 | Matsumoto et al. | |
| 2002/0147560 A1 | 10/2002 | Devins et al. | |
| 2002/0147843 A1 | 10/2002 | Rao | |
| 2002/0156918 A1 | 10/2002 | Valdevit et al. | |
| 2002/0172195 A1 | 11/2002 | Pekkala et al. | |
| 2002/0191602 A1* | 12/2002 | Woodring et al. | 370/389 |
| 2002/0196773 A1 | 12/2002 | Berman | |
| 2003/0016683 A1 | 1/2003 | George et al. | |
| 2003/0021239 A1 | 1/2003 | Mullendore et al. | |
| 2003/0026267 A1 | 2/2003 | Oberman et al. | |
| 2003/0026287 A1 | 2/2003 | Mullendore et al. | |
| 2003/0035433 A1 | 2/2003 | Craddock et al. | |
| 2003/0046396 A1 | 3/2003 | Richter et al. | |
| 2003/0072316 A1 | 4/2003 | Niu et al. | |
| 2003/0079019 A1 | 4/2003 | Lolayekar et al. | |
| 2003/0084219 A1 | 5/2003 | Yao et al. | |
| 2003/0086377 A1 | 5/2003 | Berman | |
| 2003/0091062 A1 | 5/2003 | Lay et al. | |
| 2003/0103451 A1 | 6/2003 | Lutgen et al. | |
| 2003/0117961 A1 | 6/2003 | Chuah et al. | |
| 2003/0120983 A1 | 6/2003 | Vieregge et al. | |
| 2003/0137941 A1 | 7/2003 | Kaushik et al. | |
| 2003/0174789 A1 | 9/2003 | Waschura et al. | |
| 2003/0179709 A1 | 9/2003 | Huff | |
| 2003/0179748 A1 | 9/2003 | George et al. | 370/389 |
| 2003/0189930 A1 | 10/2003 | Terrell et al. | |
| 2003/0189935 A1 | 10/2003 | Warden et al. | |
| 2003/0195983 A1 | 10/2003 | Krause | |
| 2003/0229808 A1 | 12/2003 | Heintz et al. | |
| 2004/0013092 A1 | 1/2004 | Betker et al. | |
| 2004/0013125 A1 | 1/2004 | Betker et al. | |
| 2004/0015638 A1 | 1/2004 | Bryn | |
| 2004/0024831 A1 | 2/2004 | Yang et al. | |
| 2004/0028038 A1 | 2/2004 | Anderson et al. | |
| 2004/0057389 A1 | 3/2004 | Klotz et al. | |
| 2004/0081186 A1 | 4/2004 | Warren et al. | |
| 2004/0081394 A1 | 4/2004 | Biren et al. | |
| 2004/0085955 A1 | 5/2004 | Walter et al. | |
| 2004/0100944 A1 | 5/2004 | Richmond et al. | |
| 2004/0109418 A1 | 6/2004 | Fedorkow et al. | |
| 2004/0123181 A1 | 6/2004 | Moon et al. | |
| 2004/0141521 A1 | 7/2004 | George | 370/463 |
| 2004/0151188 A1* | 8/2004 | Maveli et al. | 370/398 |

| | | |
|---|---|---|
| 2004/0153914 A1 | 8/2004 | El-Batal |
| 2004/0174813 A1 | 9/2004 | Kasper et al. |
| 2004/0208201 A1 | 10/2004 | Otake |
| 2004/0267982 A1 | 12/2004 | Jackson et al. |
| 2005/0023656 A1 | 2/2005 | Leedy |
| 2005/0036499 A1* | 2/2005 | Dutt et al. ................. 370/401 |
| 2005/0117522 A1 | 6/2005 | Basavaiah et al. |
| 2005/0177641 A1* | 8/2005 | Yamagami ................. 709/229 |
| 2005/0198523 A1* | 9/2005 | Shanbhag et al. ......... 713/200 |
| 2006/0034192 A1* | 2/2006 | Hurley et al. ............... 370/254 |
| 2006/0047852 A1 | 3/2006 | Shah et al. |
| 2006/0074927 A1 | 4/2006 | Sullivan et al. |
| 2006/0184711 A1* | 8/2006 | Pettey et al. ................ 710/316 |

FOREIGN PATENT DOCUMENTS

| | | |
|---|---|---|
| EP | 0856969 | 1/1998 |
| WO | WO-98/36537 | 8/1998 |
| WO | WO-WO03/088050 | 10/2003 |
| WO | PCT/US2005/034758 | 4/2007 |
| WO | PCT/US2005/034844 | 4/2007 |
| WO | PCT/US2005/034845 | 4/2007 |
| WO | PCT/US2005/035064 | 4/2007 |
| WO | PCT/US2005/42528 | 7/2007 |

OTHER PUBLICATIONS

U.S. Appl. No. 10/200,487, filed Jul. 22, 2002, Method and System for Principal Blade Selection in a Multi Module FC Switch.

U.S. Appl. No. 10/200,393, filed Jul. 22, 2002, Method and System for Dynamically Assigning Domain Identification in a Multi Module.

U.S. Appl. No. 10/266,360, filed Oct. 7, 2002, Method And System For Reducing Congestion In Computer Networks.

U.S. Appl. No. 10/241,153, filed Sep. 11, 2002, Zone Management In A Multi-Module Fibre Channel Switch.

U.S. Appl. No. 10/263,858, filed Oct. 3, 2002, Method And System For Using Distributed Name Servers In Multi-Module Fibre Channel Switching.

U.S. Appl. No. 10/212,425, filed Aug. 5, 2002, Method And System For Flexible Routing In A Fibre Channel System.

U.S. Appl. No. 10/302,149, filed Nov. 22, 2002, Method And System For Controlling Packet Flow In Networks.

U.S. Appl. No. 10/894,579, filed Jul. 20, 2004, Method and System for Managing Traffic in Fibre Channel Switches.

U.S. Appl. No. 10/894,546, filed Jul. 20, 2004, Method and System for Routing and Filtering Network Data Packets in Fibre Channel Systems.

U.S. Appl. No. 10/894,827, filed Jul. 20, 2004, Method and System for Selecting Virtual Lanes in Fibre Channel Switches.

U.S. Appl. No. 10/894,597, field Jul. 20, 2004, Programmable Pseudo Virtual Lanes for Fibre Channel Systems.

U.S. Appl. No. 10/894,595, filed Jul. 20, 2004, Method and System for Reducing Latency and Congestion in Fibre Channel Switches.

U.S. Appl. No. 10/664,548, filed Sep. 19, 2003, Buffer to Buffer Credit Recovery for In-Line Fibre Channel Credit Extension Devices.

U.S. Appl. No. 10/895,175, filed Jul. 20, 2004, Method and System for Detecting Congestion and Over Subscription in a Fibre Channel Network.

U.S. Appl. No. 10/894,492, filed Jul. 20, 2004, LUN Based Hard Zoning in Fibre Channel Switches.

U.S. Appl. No. 10/894,587, filed Jul. 20, 2004, Multi Speed Cut Through Operation in Fibre Channel Switches.

U.S. Appl. No. 10/894,726, filed Jul. 20, 2004, Method and System for Improving Bandwidth & Reducing Idles in Fibre Channel Switches.

U.S. Appl. No. 10/894,629, filed Jul. 20, 2004, Method and System for Routing Fibre Channel Systems.

U.S. Appl. No. 10/894,491, filed Jul. 20, 2004, Method and System for Keeping a Fibre Channel Arbitrated Loop Open During Frame Gaps.

U.S. Appl. No. 10/894,536, filed Jul. 20, 2004, Method And System For Congestion Control Based On Optimum Bandwidth Allocation In A Fibre Channel Switch.

U.S. Appl. No. 10/894,627, filed Jul. 20, 2004, Method and System for Programmable Data Dependent Network Routing.

U.S. Appl. No. 10/719,077, filed Nov. 21, 2003, Method and System for Monitoring Events in Storage Area Networks.

U.S. Appl. No. 10/894,689, filed Jul. 20, 2004, Method and System for Power Control of Fibre Channel Switches.

U.S. Appl. No. 10/798,527, filed Mar. 11, 2004, Method and System for Preventing Deadlock in Fibre Channel Fabrics using Frame Priorities.

U.S. Appl. No. 10/798,468, filed Mar. 11, 2004, Method and System for Reducing Deadlock in Fibre Channel Fabrics using Virtual Lanes.

U.S. Appl. No. 10/894,586, filed Jul. 20, 2004, Method and System for Buffer to Buffer Credit recovery in Fibre Channel Systems Using Virtual and/or Pseudo Virtual Lane.

U.S. Appl. No. 10/889,635, filed Jul. 12, 2004, Method And System For Inexpensive And Non-Disruptive Data Capture In Networks.

U.S. Appl. No. 10/889,337, filed Jul. 12, 2004, Method And System For Minimizing Disruption In Common-Access Networks.

U.S. Appl. No. 10/889,259, filed Jul. 12, 2004, Method And Apparatus For Detecting And Removing Orphaned Primitives In A Fibre Channel Network.

U.S. Appl. No. 10/889,267, filed Jul. 12, 2004, Method And System For Fibre Channel Arbitrated Loop Acceleration.

U.S. Appl. No. 10/889,551, filed Jul. 12, 2004, Method And Apparatus For Testing Loop Pathway Integrity In A Fibre Channel Arbitrated Loop.

U.S. Appl. No. 10/889,256, filed Jul. 12, 2004, Method And Apparatus For Accelerating Receive-Modify-Send Frames In A Fibre Channel Network.

U.S. Appl. No. 10/889,255, filed Jul. 12, 2004, Method and Apparatus for Test Pattern Generation.

U.S. Appl. No. 10/889,588, filed Jul. 12, 2004, Method And Apparatus For Improving Buffer Utilization In Communication Networks.

U.S. Appl. No. 10/894,597, filed Jul. 20, 2004, Method And System For Using Extended Fabric Features With Fibre Channel Switch Elements.

U.S. Appl. No. 10/894,978, filed Jul. 20, 2004, Method And System for Programmable Data Dependent.

U.S. Appl. No. 10/894,917, filed Jul. 20, 2004, Method and System for Configuring Fibre Channel Ports.

U.S. Appl. No. 10/894,529, filed Jul. 20, 2004, Integrated Fibre Channel Fabric Controller.

U.S. Appl. No. 10/894,732, filed Jul. 20, 2004, Method And System For Congestion Control In A Fibre Channel Switch.

Clark, Tom, "Zoning for Fibre Channel Fabrics", Vixel Corporation Paper—XP002185194., (Aug. 1999), pp. 1-6.

Malavalli, Kumar, et al., "Distributed Computing with fibre channel fabric", Proc of the Computer Soc. Int'l Conf., Los Alamitos, IEEE Comp Soc. Press., vol. Conf. 37, XP000340745, (Feb. 24, 1992), pp. 269-274.

Martin, Charles R., "Fabric Interconnection of fibre channel standard nodes", Proceedings of the SPIE, (Sep. 8, 1992), pp. 65-71.

Yoshida, Hu, "LUN Security Considerations for Storage Area Networks," Hitachi Data Systems Paper—XP002185193 (1999), pp. 1-7.

Presentation by Brocade- Titled "Virtual Channel Architecture" by Bill Martin, Steve Wilson and Vince Guan Dated Jun. 2, 2003.

Banks, David C., et al., "Link Trunking and Measuring Link Latency in Fibre Channel Fabric", U.S. Appl. No. 60/286,046, 1-52, filed Apr. 23, 2001.

Brown, Douglas W., "A State-Machine Synthesizer", *18th Design Automation Conference*, (1981),301-305.

Curtis, A. R., "Design Considerations for 10-Gbit Fibre Channel", *Curtis A. Ridgeway, Distinguished I/O Architect, Storage and Computing ASIC's Division, LSI Logic Corp.*, Apr. 14, 2003.

Malavalli, Kumar, "High Speed Fibre Channel Switching Fabric Services", *Proceedings of the SPIE, SPIE,* Bellingham, VA, USA vol. 1577., XP000562869, ISSN: 0277-786X,(Sep. 4, 1991),216-226.

Melhem, et al., "Minimizing Wavelength Conversions In WDM Path Establishment", *Computer Science Department, University of Pittsburgh,* Pittsburgh, PA 15260, (2001), 197-211.

Ridgeway, Curt, "0GFC-40GFC using 4-lane XAUI's", *LSI Logic Presentation—T11/03-069v0,* Feb. 3, 2003.

* cited by examiner

FIBRE CHANNEL TRANSPARENT SWITCH FOR MIXED SWITCH FABRICS

BACKGROUND

1. Field of the Invention

The present invention relates to Fibre Channel networks, and more particularly to a transparent Fibre Channel switch that facilities communication in a Fibre Channel network that includes at least a proprietary Fibre Channel fabric switch.

2. Background of the Invention

Fibre Channel is a set of American National Standard Institute (ANSI) standards, which provide a serial transmission protocol for storage and network protocols such as HIPPI, SCSI, IP, ATM and others. Fibre Channel provides an input/output interface to meet the requirements of both channel and network users.

Fibre Channel supports three different topologies: point-to-point, arbitrated loop and Fibre Channel fabric. The point-to-point topology attaches two devices directly. The arbitrated loop topology attaches devices in a loop. The Fibre Channel fabric topology attaches host systems directly to a fabric, which are then connected to multiple devices. The Fibre Channel fabric topology allows several media types to be interconnected.

In Fibre Channel, a path is established between two nodes where the path's primary task is to transport data from one point to another at high speed with low latency, performing only simple error detection in hardware.

Fibre Channel fabric devices include a node port or "N_Port" that manages fabric connections. The N_port establishes a connection to a fabric element (e.g., a switch) having a fabric port or F_port. Fabric elements include the intelligence to handle routing, error detection, recovery, and similar management functions.

A Fibre Channel switch is a multi-port device where each port manages a simple point-to-point connection between itself and its attached system. Each port can be attached to a server, peripheral, I/O subsystem, bridge, hub, router, or even another switch. A switch receives messages from one port and automatically routes it to another port. Multiple calls or data transfers happen concurrently through the multi-port Fibre Channel switch.

Fibre Channel switches use memory buffers to hold frames received and sent across a network. Associated with these buffers are credits, which are the number of frames that a buffer can hold per fabric port.

Storage area networks ("SANs") are commonly used where plural memory storage devices are made available to various host computing systems. Data in a SAN is typically moved from plural host systems (that include computer systems, servers etc.) to a storage system through various controllers/adapters. The Fibre Channel standard is commonly used in SANs today.

FIG. 1A shows an example of a Fibre Channel network. In FIG. 1A, host system 10 is coupled to a standard fabric switch 13. Host system 10 (and/or 10A) typically includes several functional components. These components may include a central processing unit (CPU), main memory, input/output ("I/O") devices (not shown), read only memory, and streaming storage devices (for example, tape drives).

Host systems (for example, 10 and 10A) often communicate with storage systems (for example, devices 15 and 27) via a host bus adapter ("HBA", may also be referred to as a "controller" and/or "adapter") using an interface, for example, a "PCI" or PCI-X bus interface.

FIG. 1A shows four HBAs, 11, 12, 20 and 22. HBA 11 is coupled to switch 13 via port 17, HBA 12 is coupled via port 18, HBA 20 is coupled via port 19 and HBA 22 is coupled via port 21.

Fabric switch 13 is coupled to a proprietary Fibre Channel fabric switch 14 (may also be referred to as "Proprietary Switch 14" or "switch 14") via ports 23 and 16. Fabric switch 13 is also coupled to another proprietary Fibre Channel fabric 26 via ports 24 and 25. Proprietary Switch 14 is coupled to device 15 that may be a storage sub-system, while proprietary fabric switch 26 (may also be referred to as "proprietary switch 26" or "switch 26") is coupled to device 27 which may also be a storage sub-system.

Devices 15 and 27 may be coupled using the Small Computer Systems Interface ("SCSI") protocol and use the SCSI Fibre Channel Protocol ("SCSI FCP") to communicate with other devices/systems. Both the SCSI and SCSI_FCP standard protocols are incorporated herein by reference in their entirety. SCSI FCP is a mapping protocol for applying SCSI command set to Fibre Channel.

Although Fibre Channel is an industry standard, proprietary switches, for example, 14 and 26 are quite common. Such switches often use confidential internal switching technology that allows a host system to communicate with a target device and vice-versa. Often a Fibre Channel network has more than one proprietary switching technology. Brocade Communications Inc ® and McData Corporation® are two such corporations that provide such proprietary switching technology.

Proprietary switches have shortcomings. For example, when a proprietary switch (for example, 14) locates/communicates with a non-proprietary switch (for example, fabric switch 13) there is a loss of functionality. This forces SAN builders to use the proprietary switching technology. This loss of functionality becomes sever in mixed vendor environment. For example, in FIG. 1A, use of switch 13 will result in loss of functionality with respect to both switches 14 and 26.

Although standardization is the future of Fibre Channel networks, mixed vendor configurations are a commercial reality. Therefore, there is a need for a Fibre Channel switch that will allow host systems and devices to communicate in a configuration with mixed vendor/proprietary switching technology without any loss of functionality.

SUMMARY OF THE PRESENT INVENTION

A network that allows communication between a proprietary switch fabric and a host system is provided. The network includes a Fibre Channel switch element that is operationally coupled to the host system and to the proprietary switch fabric. The Fibre Channel switch element's presence is transparent to the proprietary switch fabric when the host system communicates with a target device that is coupled to the proprietary switch fabric. The proprietary switch fabric communicates through a port of the Fibre Channel switch element as if it was communicating directly with the host system.

In another aspect of the present invention, a Fibre Channel switch element that allows communication between a host system and a target device that is attached to a proprietary switch fabric is provided. The Fibre Channel switch element includes a first port that communicates with the target device through the proprietary switch fabric by logging on behalf of the host system so that the proprietary switch behaves as if it was directly communicating with the host system.

The Fibre Channel switch element also includes a second port that communicates with the host system and collects HBA identification information, wherein the identification information is used to map the first port to the second port so that when the host system communicates with the target device the Fibre Channel switch element is transparent to the proprietary switch fabric. HBA identification information is collected during a FLOGI process of the second port. Also, the Fibre Channel switch element initiates a FLOGI procedure on behalf of the host system.

In yet another aspect of the present invention, a method of communication between a host system and a target device that is attached to a proprietary switch fabric is provided. The method includes, collecting a HBA's identification information during a FLOGI process of a first port that couples the host system to a Fibre Channel switch element; and initiating a FLOGI procedure across a second port that couples the proprietary switch fabric to the Fibre Channel switch element, wherein the Fibre Channel switch element initiates the FLOGI on behalf of the host system and the second port records a FC_ID that is received from the proprietary switch fabric.

The Fibre Channel switch element maps the first port to the second port allowing communication between the host system and the target device, wherein the Fibre Channel switch element is transparent to the proprietary switch fabric.

This brief summary has been provided so that the nature of the invention may be understood quickly. A more complete understanding of the invention can be obtained by reference to the following detailed description of the preferred embodiments thereof concerning the attached drawings.

BRIEF DESCRIPTION OF THE DRAWINGS

The foregoing features and other features of the present invention will now be described with reference to the drawings of a preferred embodiment. In the drawings, the same components have the same reference numerals. The illustrated embodiment is intended to illustrate, but not to limit the invention. The drawings include the following Figures.

DETAILED DESCRIPTION OF THE PREFERRED EMBODIMENTS

Figure 1A:
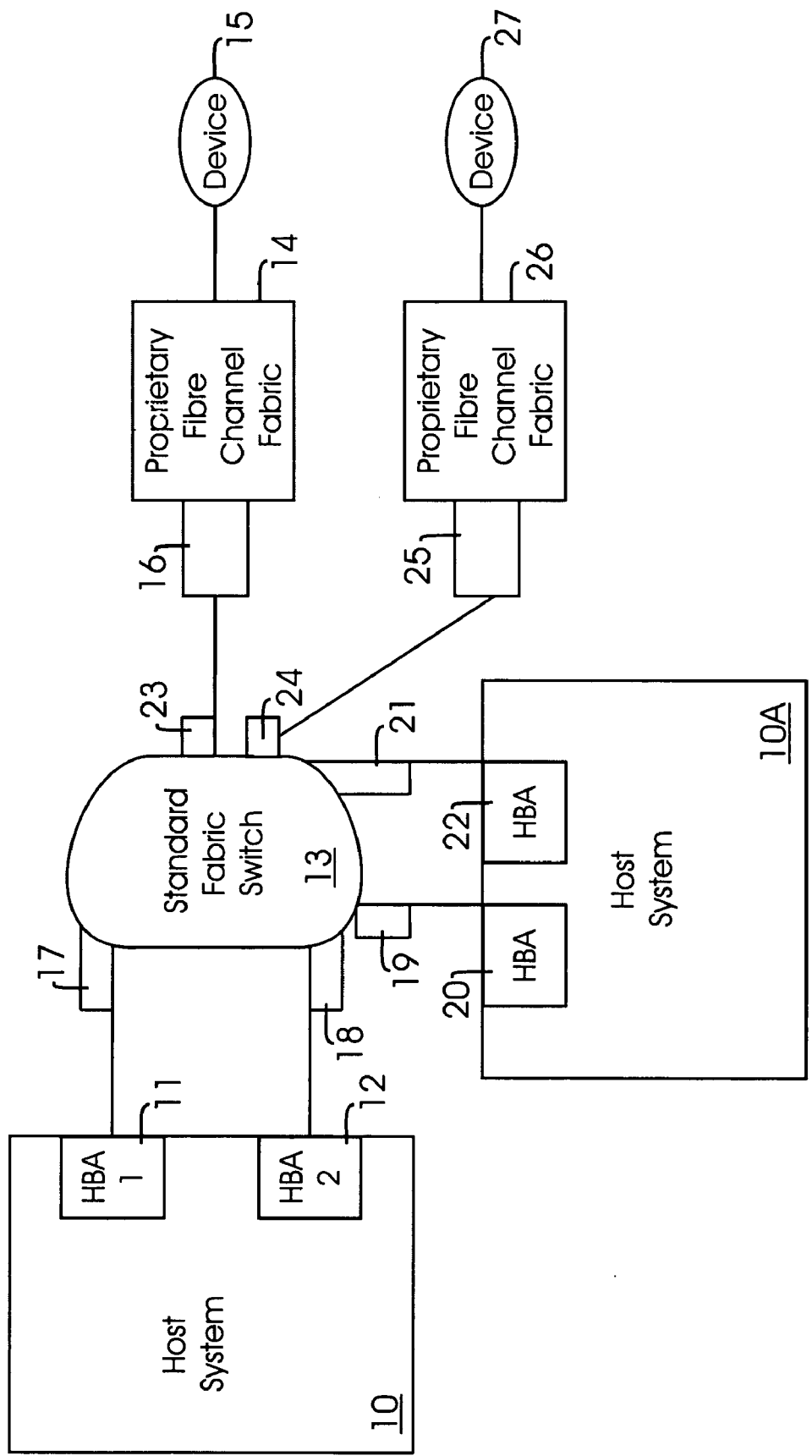
FIG. 1A shows an example of a Fibre Channel network.

Definitions:

The following definitions are provided as they are typically (but not exclusively) used in the Fibre Channel environment, implementing the various adaptive aspects of the present invention.

"ALPA": Aribitrated Loop Physical Address as defined by the Fibre Channel Standards.

"D_ID": A 24-bit Fibre Channel header that contains the destination address for a frame.

"E_Port": A fabric expansion port that attaches to another Interconnect port to create an Inter-Switch Link.

"F_Port": A port to which non-loop N_Ports are attached to a fabric and does not include FL_ports.

"Fibre Channel ANSI Standard": The standard (incorporated herein by reference in its entirety) describes the physical interface, transmission and signaling protocol of a high performance serial link for support of other high level protocols associated with IPI, SCSI, IP, ATM and others.

"Fabric": The structure or organization of a group of switches, target and host devices (NL_Port, N_ports etc.).

"Fabric Topology": This is a topology where a device is directly attached to a Fibre Channel fabric that uses destination identifiers embedded in frame headers to route frames through a Fibre Channel fabric to a desired destination.

"FC_ID": A generic Fibre Channel address identifier, for example, the D_ID and S_ID.

"FLOGI": Before a Fibre Channel port can send data, the port determines information regarding its operating environment. This includes factors like interconnect topology; other ports in the environment; classes of Service and error recovery services that may be available. To determine this information, a port performs a login procedure. The login procedure includes Fabric Login ("FLOGI") and N_Port Login ("PLOGI, defined below). The Port requesting FLOGI sends Extended Link Service Commands, which includes a Sequence in its own Exchange with a header and Payload format. A recipient of the FLOGI accepts the login by sending an accept ("ACC") command. The format for FLOGI is defined by the Fibre Channel standards.

"Initiator": A device that initiates an input/output ("IO" or "I/O") operation, for example, a HBA.

"L_Port": A port that contains Arbitrated Loop functions associated with the Arbitrated Loop topology.

"OX_ID": An Originator (i.e., a device/port that originates an exchange) Exchange identification field in a Fibre Channel frame header.

"Name Server": Fibre Channel Generic Services (FC-GS-3) specification describes in section 5.0 various Fibre Channel services that are provided by Fibre Channel switches including using a Name Server to discover Fibre Channel devices coupled to a fabric. A Name server provides a way for N_Ports and NL_Ports to register and discover Fibre Channel attributes. Request for Name server commands are carried over the Common Transport protocol, also defined by FC-GS-3. The Name Server information is distributed among fabric elements and is made available to N_Ports and NL_Ports after the ports have logged in. Various commands are used by the Name Server protocol, as defined by FC-GS-3, for registration, de-registration and queries. Fiber Channel Switched Fabric (FC-SW-2) specification describes how a Fabric consisting of multiple switches implements a distributed Name Server.

"N-Port": A direct fabric attached port, for example, a disk drive or a HBA.

"NL_Port": A L_Port that can perform the function of a N_Port.

"PLOGI": Standard Fibre Channel N_Port to N_Port login. The N_Port login is performed after the FLOGI. PLOGI determines the N_port to N_Port parameters and provides a specific set of operating parameters for communicating between N_ports. The port requesting PLOGI sends a PLOGI Extended Link Service Request addressed to the D_ID of an N_Port with which it needs to communicate. The addressed N_Port then returns an ACC reply. The request and reply contain operating parameters for communication between the N_Ports. The format for the request and reply are provided by the Fibre Channel standards.

"Port": A general reference to N. Sub.—Port or F. Sub.—Port.

"SAN": Storage Area Network

"SCSI FCP": A standard protocol, incorporated herein by reference in its entirety for implementing SCSI on a Fibre Channel SAN.

"S_ID": A 24-bit field in a Fibre Channel frame header that contains the source address for a frame.

"Switch": A fabric element conforming to the Fibre Channel Switch standards.

"Target": A device that accepts IO operations from Initiators, for example, storage devices such as disks and tape drives.

Fibre Channel System:

To facilitate an understanding of the preferred embodiment, the general architecture and operation of a Fibre Channel system will be described. The specific architecture and operation of the preferred embodiment will then be described with reference to the general architecture of the Fibre Channel system.

Figure 1B:
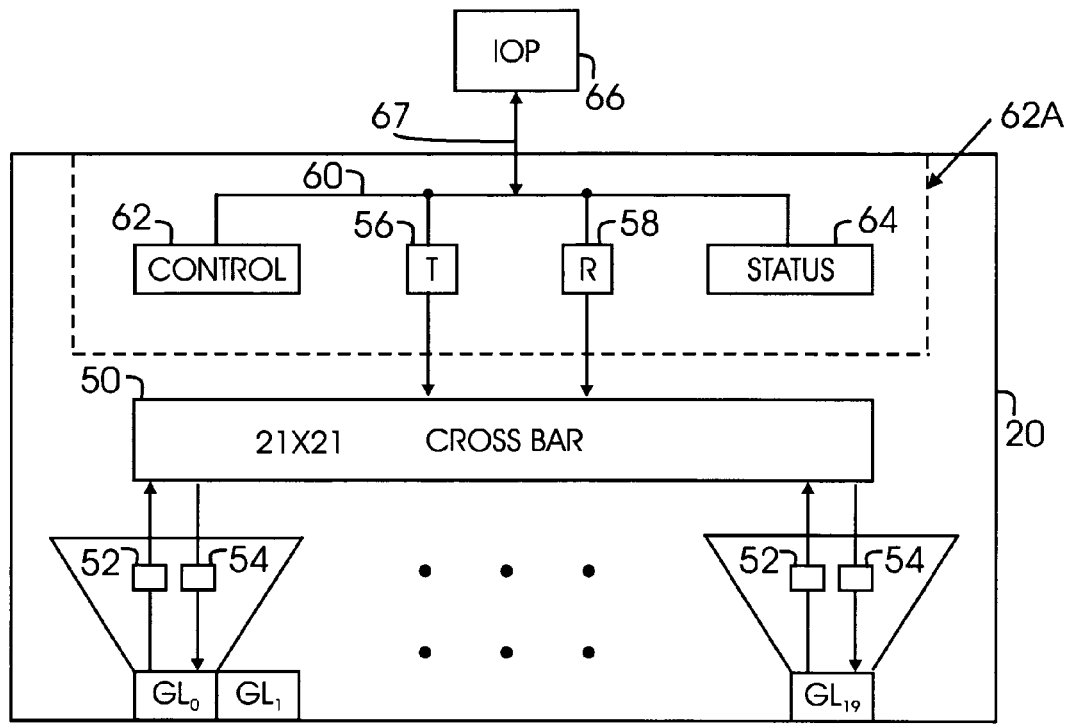
FIG. 1B shows an example of a Fibre Channel switch element, according to one aspect of the present invention.
Figure 1C:
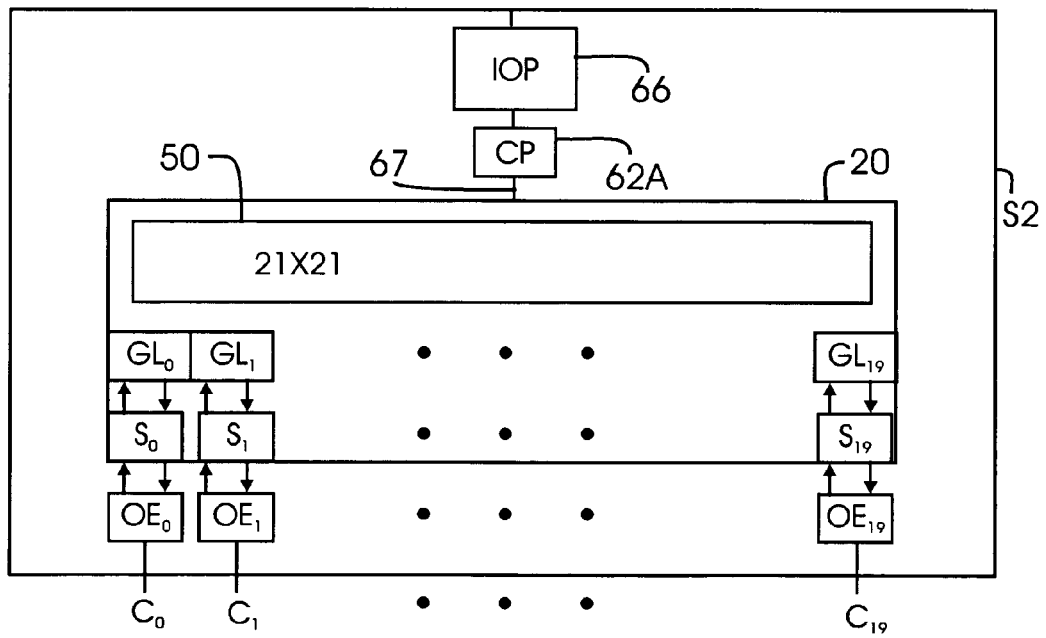
FIG. 1C shows a block diagram of a 20-channel switch chassis, according to one aspect of the present invention.
Figure 1D:
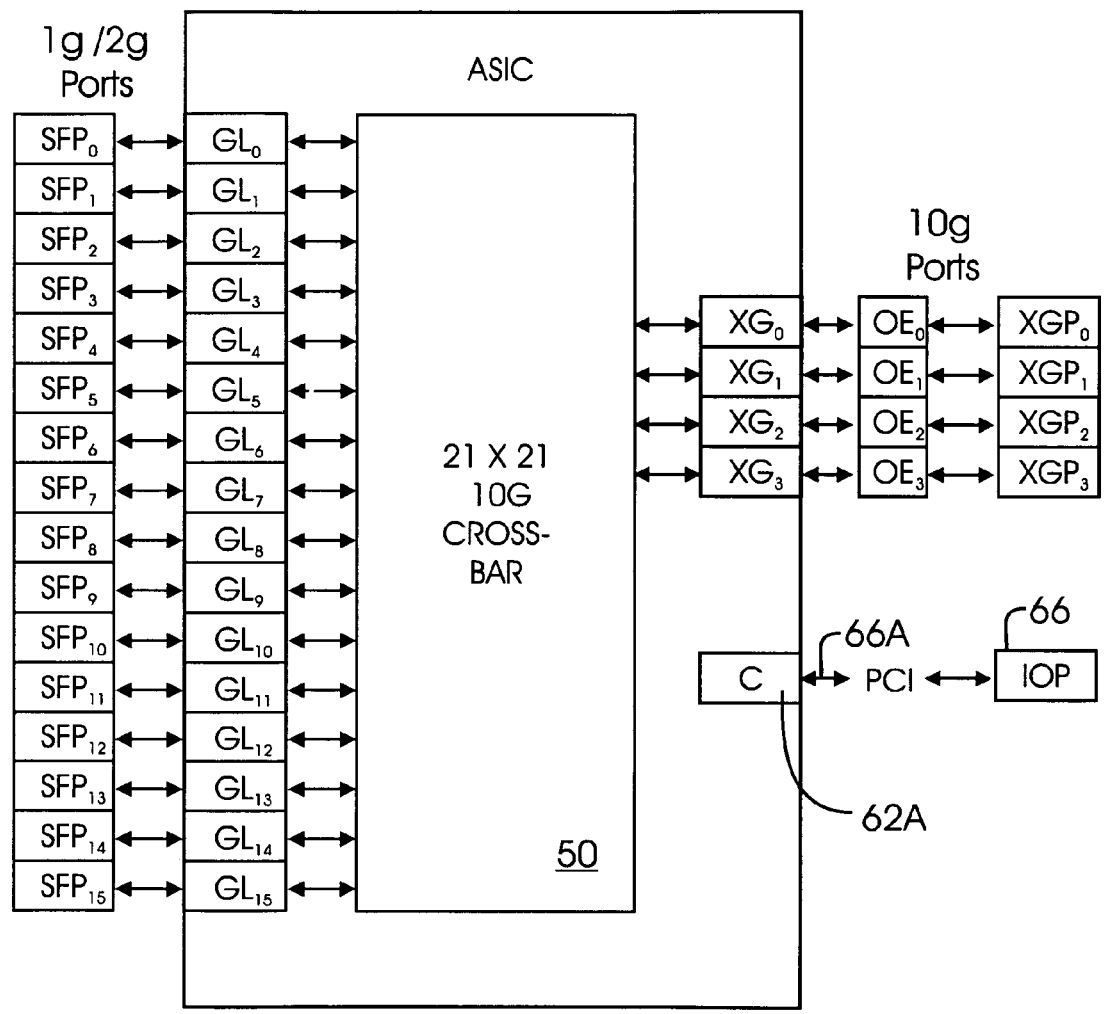
FIG. 1D shows a block diagram of a Fibre Channel switch element with sixteen GL_Ports and four 10G ports, according to one aspect of the present invention.
Figure 1E:
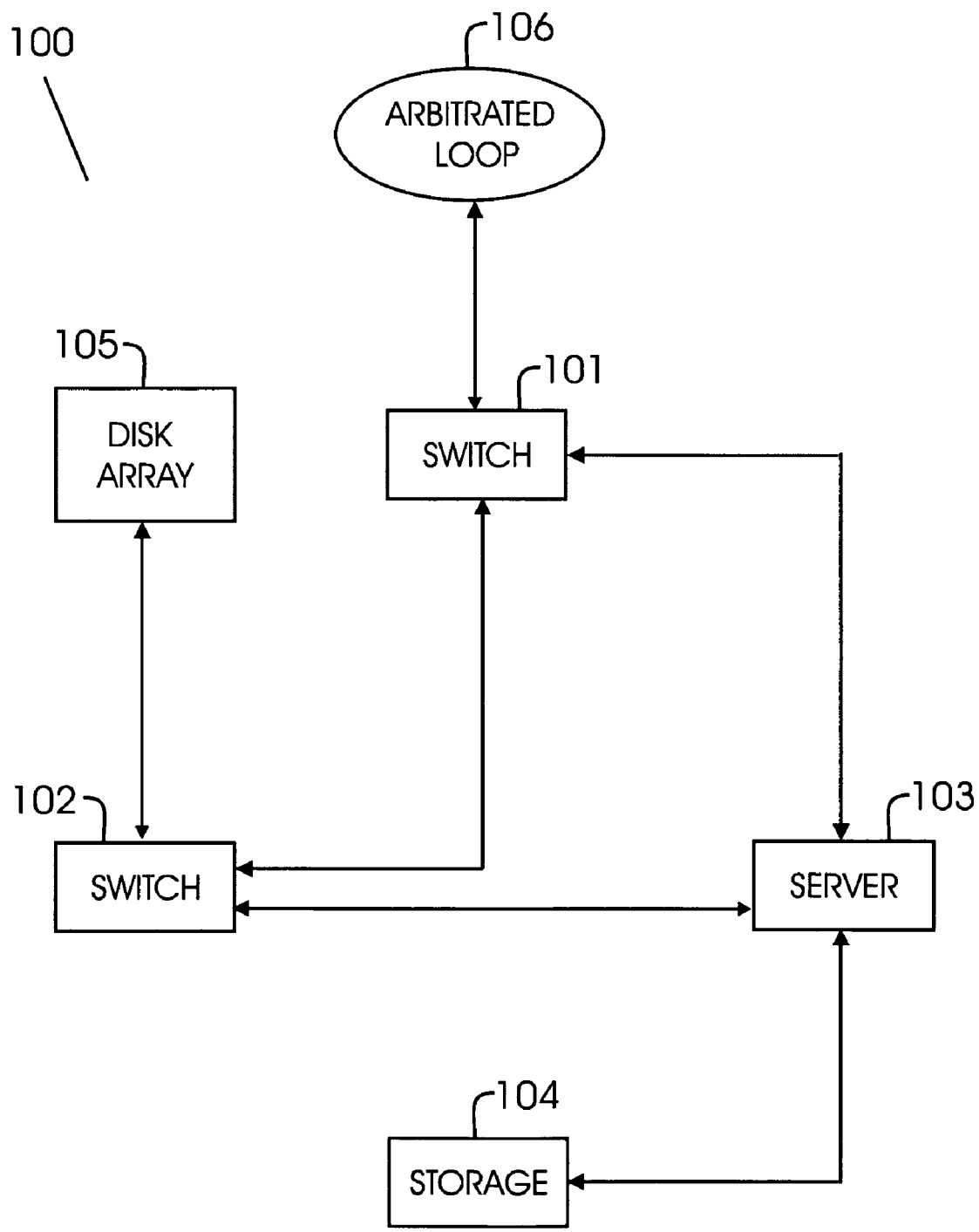
FIG. 1E shows a block diagram of an overall Fibre channel system that can use one aspect of the present invention.

FIG. 1E is a block diagram of a Fibre Channel system 100 implementing the methods and systems in accordance with the adaptive aspects of the present invention. System 100 includes plural devices that are interconnected. Each device includes one or more ports, classified as node ports (N_Ports), fabric ports (F_Ports), and expansion ports (E_Ports). Node ports may be located in a node device, e.g. server 103, disk array 105 and storage device 104.

Fabric ports are located in fabric devices such as switch 101 and 102. Arbitrated loop 106 may be operationally coupled to switch 101 using arbitrated loop ports (FL_Ports).

The devices of FIG. 1E are operationally coupled via "links" or "paths". A path may be established between two N_ports, e.g. between server 103 and storage 104. A packet-switched path may be established using multiple links, e.g. an N-Port in server 103 may establish a path with disk array 105 through switch 102.

Switch Element

FIG. 1B is a block diagram of a 20-port ASIC fabric element according to one aspect of the present invention. FIG. 1B provides the general architecture of a 20-channel switch chassis using the 20-port fabric element. Fabric element includes ASIC 20 with non-blocking Fibre Channel class 2 (connectionless, acknowledged) and class 3 (connectionless, unacknowledged) service between any ports. It is noteworthy that ASIC 20 may also be designed for class 1 (connection-oriented) service, within the scope and operation of the present invention as described herein.

The fabric element of the present invention is presently implemented as a single CMOS ASIC, and for this reason the term "fabric element" and ASIC are used interchangeably to refer to the preferred embodiments in this specification. Although FIG. 1B shows 20 ports, the present invention is not limited to any particular number of ports.

ASIC 20 has 20 ports numbered in FIG. 1B as GL0 through GL19. These ports are generic to common Fibre Channel port types, for example, F_Port, FL_Port and E-Port. In other words, depending upon what it is attached to, each GL port can function as any type of port.

For illustration purposes only, all GL ports are drawn on the same side of ASIC 20 in FIG. 1B. However, the ports may be located on both sides of ASIC 20 as shown in other figures. This does not imply any difference in port or ASIC design. Actual physical layout of the ports will depend on the physical layout of the ASIC.

Each port GL0-GL19 has transmit and receive connections to switch crossbar 50. One connection is through receive buffer 52, which functions to receive and temporarily hold a frame during a routing operation. The other connection is through a transmit buffer 54.

Switch crossbar 50 includes a number of switch crossbars for handling specific types of data and data flow control information. For illustration purposes only, switch crossbar 50 is shown as a single crossbar. Switch crossbar 50 is a connectionless crossbar (packet switch) of known conventional design, sized to connect 21×21 paths. This is to accommodate 20 GL ports plus a port for connection to a fabric controller, which may be external to ASIC 20.

In the preferred embodiments of switch chassis described herein, the fabric controller is a firmware-programmed microprocessor, also referred to as the input/out processor ("IOP"). IOP 66 is shown in FIG. 1C as a part of a switch chassis utilizing one or more of ASIC 20. As seen in FIG. 1B, bi-directional connection to IOP 66 is routed through port 67, which connects internally to a control bus 60. Transmit buffer 56, receive buffer 58, control register 62 and Status register 64 connect to bus 60. Transmit buffer 56 and receive buffer 58 connect the internal connectionless switch crossbar 50 to IOP 66 so that it can source or sink frames.

Control register 62 receives and holds control information from IOP 66, so that IOP 66 can change characteristics or operating configuration of ASIC 20 by placing certain control words in register 62. IOP 66 can read status of ASIC 20 by monitoring various codes that are placed in status register 64 by monitoring circuits (not shown).

FIG. 1C shows a 20-channel switch chassis S2 using ASIC 20 and IOP 66. S2 will also include other elements, for example, a power supply (not shown). The 20 GL_Ports correspond to channel C0-C19. Each GL_Port has a serial/deserializer (SERDES) designated as S0-S19. Ideally, the SERDES functions are implemented on ASIC 20 for efficiency, but may alternatively be external to each GL_Port. The SERDES converts parallel data into a serial data stream for transmission and converts received serial data into parallel data. The 8 bit to 10 bit encoding enables the SERDES to generate a clock signal from the received data stream.

Each GL_Port may have an optical-electric converter, designated as OE0-OE19 connected with its SERDES through serial lines, for providing Fibre optic input/output connections, as is well known in the high performance switch design. The converters connect to switch channels C0-C19. It is noteworthy that the ports can connect through copper paths or other means instead of optical-electric converters.

FIG. 1D shows a block diagram of ASIC 20 with sixteen GL ports and four 10G (Gigabyte) port control modules designated as XG0-XG3 for four 10G ports designated as XGP0-XGP3. ASIC 20 include a control port 62A that is coupled to IOP 66 through a PCI connection 66A.

Figure 2A:
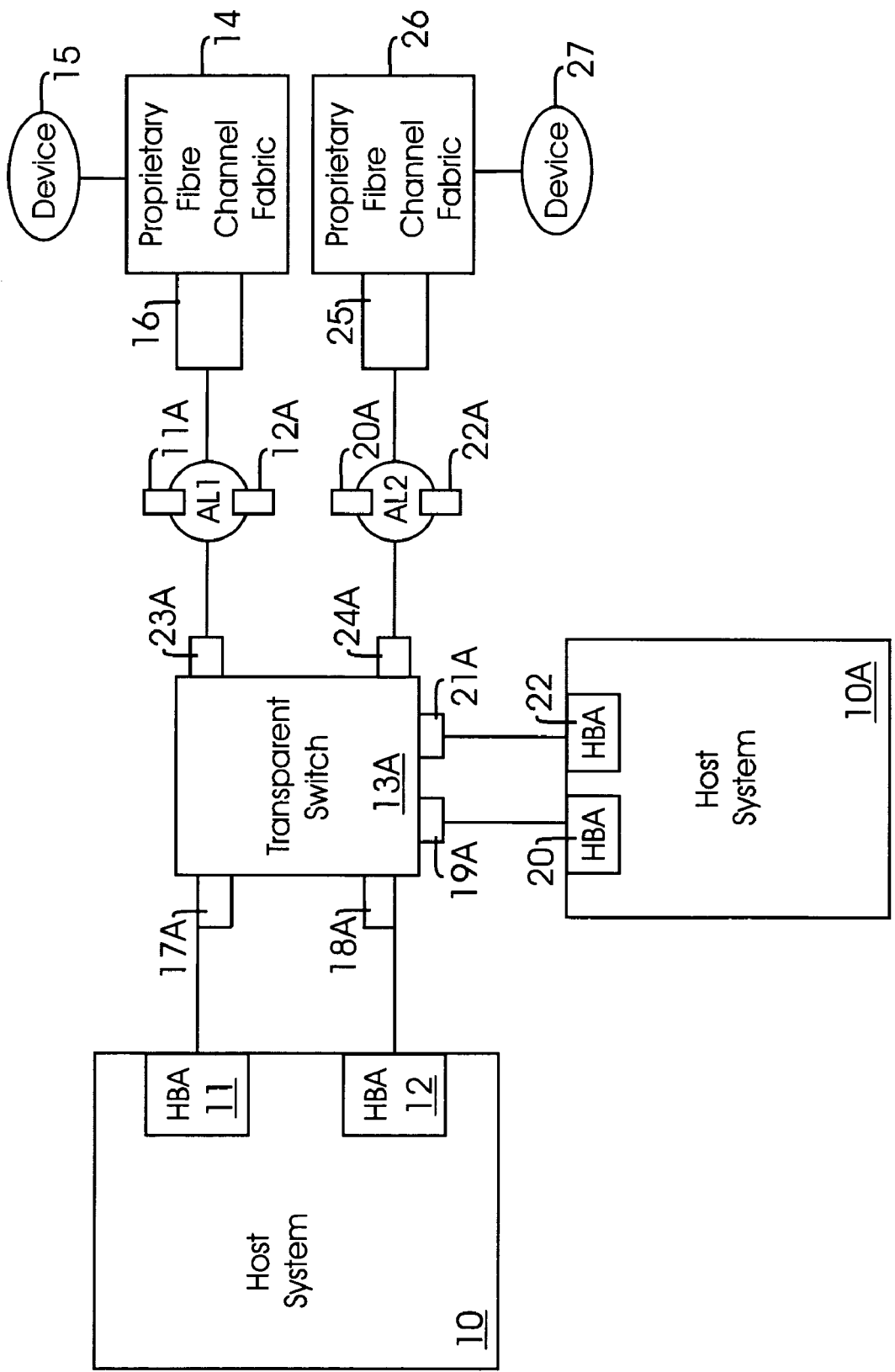
FIGS. 2A, 2C and 2D show block diagrams of various topologies using a transparent switch, according to one aspect of the present invention.

Loop Based Fabric Interface:

FIG. 2A shows a top-level block diagram using a transparent switch 13A, according to one aspect of the present invention. Transparent switch 13A (may also be referred to as "switch 13A") may be implemented using ASIC switch element 20 in chassis S2. Transparent switch 13A is coupled to HBA 11 via port 17A and HBA 12 via port 18A. Switch 13A is also coupled to HBA 20 via port 19A and HBA 22 via port 21A. Ports 17A, 18A, 19A and 21A are designated as TH_Ports (Transparent host ports), while ports 23A and 24A are designated as transparent fabric ports (TF_Ports or TFL_Ports (used interchangeably throughout this specification) (for loop functionality). Virtualized ALPAs for each HBA is shown as 11A, 12A, 20A and 22A, respectively.

Proprietary Fibre Channel fabric 14 communicates with ports 23A and 24A that function as NL_Ports. Proprietary switch 14 (or 26) believes that it is communicating with a host system directly and hence, there is no loss of functionality. It is noteworthy that although TH_Ports are shown as being linked with host systems, these ports may also be linked to storage devices.

Figure 2B:
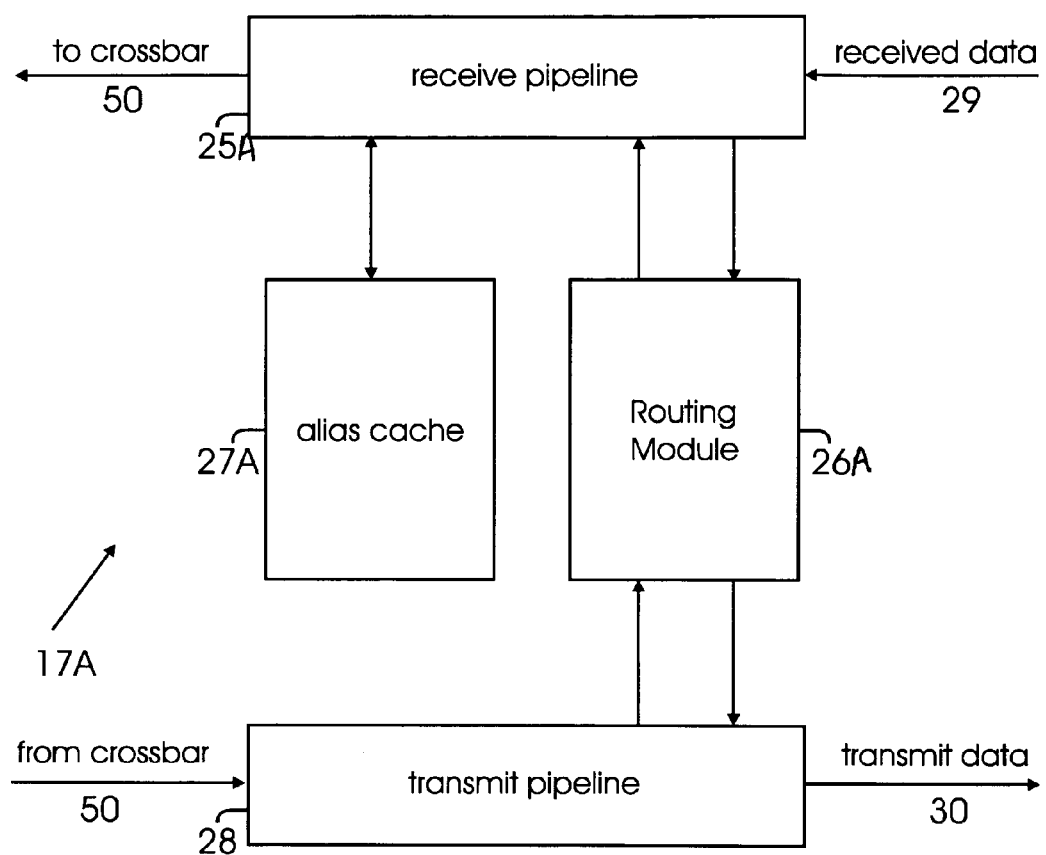
FIG. 2B shows a block diagram of a port in a transparent switch, according to one aspect of the present invention.

FIG. 2B shows an example of a port (for example, 17A), according to one aspect of the present invention. Port 17A includes a receive pipeline 25A that receives Fibre Channel frames/data 29. Received data 29 is processed and then via crossbar 50 moves to the transmit pipeline 28. The transmit pipeline 28 transmits data 30 to the destination. Details of the pipelines and how frames are transmitted using alias cache 27A are provided in the patent application Ser. No. 10/894,546, filed on Jul. 20, 2004, the disclosure of which is incorporated herein by reference in its entirety. Alias cache 27A is used to facilitate communication between a host and a device.

Figure 3:
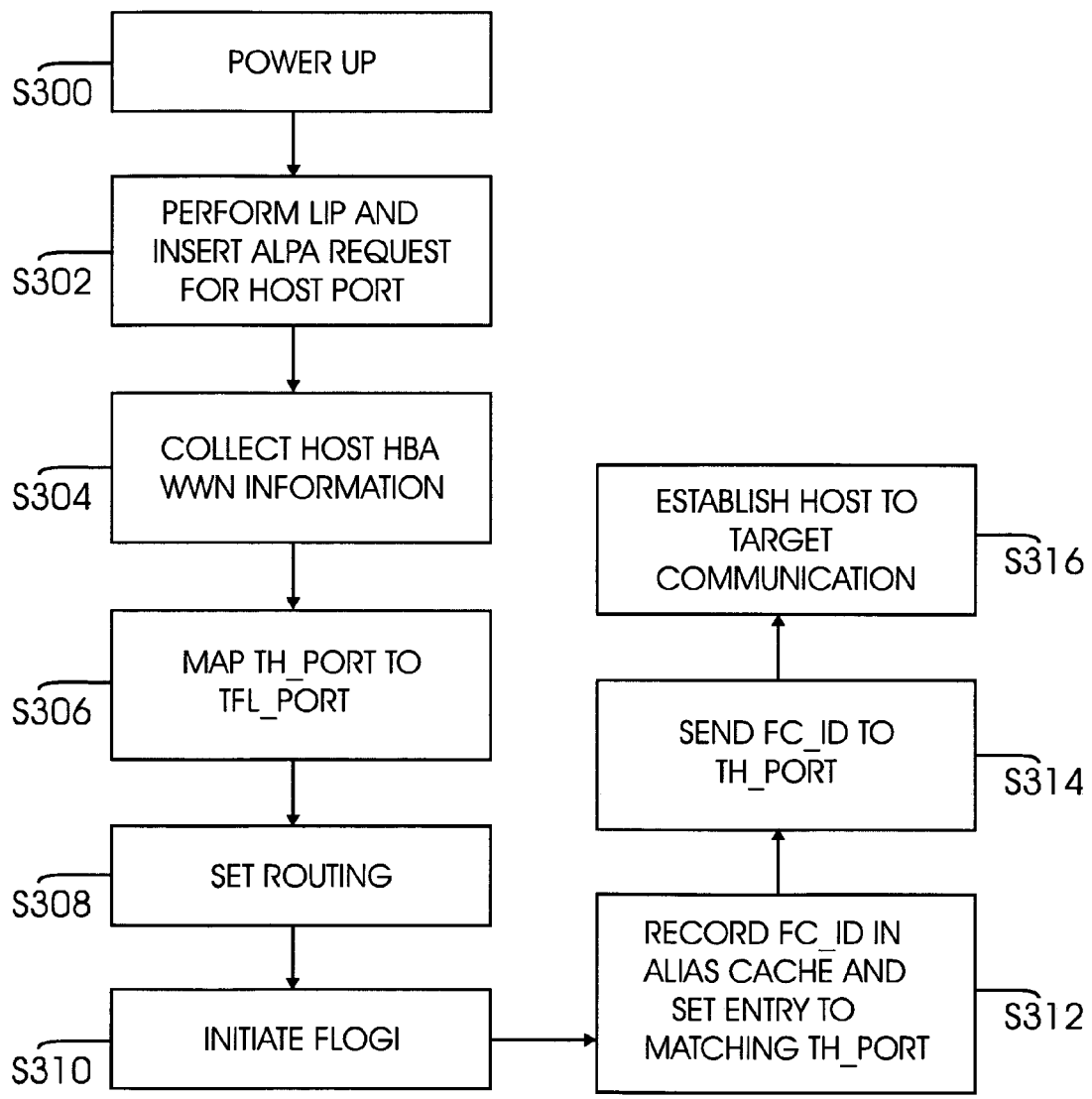
FIGS. 3, 4 and 5 shows process flow diagrams of using the transparent switch, according to one aspect of the present invention.

FIG. 3 shows a flow diagram of process steps that allow communication between a host system and a device behind a proprietary Fibre Channel fabric.

Transparent switch 13A acts as a proxy/bridge for attached host systems 10 and 10A. The fabric side ports (TFL_Ports) operate in a NL_Port link state mode. Each TFL_Port reserves ALPAS for all HBAs (11, 12, 20 and 22). Switch 13A FLOGIs on behalf of host system 10 and 10A across the TFL_Ports. FC_IDs are assigned by the TFL_Ports and stored in alias cache 27A and are used for communication between the hosts and target devices.

Turning in detail to FIG. 3, in step S300, transparent switch 13A is powered up. In step S302, the fabric side (i.e., ports 23A and 24A) is brought up through loop initialization (Fibre Channel standard process). Switch 13A does not perform FLOGI (standard log-in procedure) during this step. Switch 13A inserts an ALPA request for every host port that it can service, shown as 11A, 12A, 20A and 22A in FIG. 2A.

In step S304, switch 13A collects each supported HBA's unique worldwide number ("WWN"), which is provided by the HBA manufacturer. Switch 13A collects the WWN information during FLOGI by the TH_Ports (i.e., 17A, 18A, 19A and 21A). HBAs send an ACC (accept) response to the TH_Ports with the WWN number.

In step S306, switch 13A maps the TH_Ports to the TFL_Ports (i.e., 23A and/or 24A). In step S308, the mapping information is set in routing module 26A so that each TH_Port points to the matching TFL_Port. Routing module 26A is similar to the steering state machine described in the aforementioned patent application.

In step S310, switch 13A initiates a FLOGI across the TFL_Ports on behalf of the host. In step S312, the TFL_Ports record the FC_ID from the ACC response into alias cache 27A and then sets an entry to point to the matching TH_Port.

In step S314, FLOGI is performed across TH_Ports. Switch 13A responds to the TH_Ports with the FC_ID acquired in step S310. At this point switch 13A becomes transparent.

In step S316, host (for example, 10) to target (for example, device 15) communication is established. Host N_Ports' PLOGI to the Name Server pass straight through to the TFL_Ports and then via the proprietary fabrics (14 and/or 15) to the devices (for example, 15 and/or 27).

If a TF_Port goes down, then the matching TH_ports are also brought down. The TH_ports are then re-assigned to the remaining TF_Ports and the routing module 26A is adjusted based on the new assignment. For example, if TFL_Port 23A assigned to TH_Port 17A goes down, then TH_port 17A may be re-assigned to port 24A.

If a TH_Port goes down then the corresponding TF_Port performs a loop initialization ("LIP") to remove any matching ALPA. The remaining TH_Ports wait until the TF_Port completes the LIP process.

Virtual N Port ID Fabric Side Interface

Virtual N_Port_ID ("VNPID") is defined by the FC_FS standard, incorporated herein by reference in its entirety. VNPID provides link level capability multiple N_Port identifiers (Fibre Channel addresses) to a N_Port device. Typically, this is accomplished after FLOGI when the N_Port device sends a FDISC command with a new WWPN (World Wide Port Number) and the S_ID is set to 0. The switch responds with a new N_Port_ID having the same Domian/Area values but a different Port_ID value (which is the ALPA field for all NL_Ports).

Figure 2C:
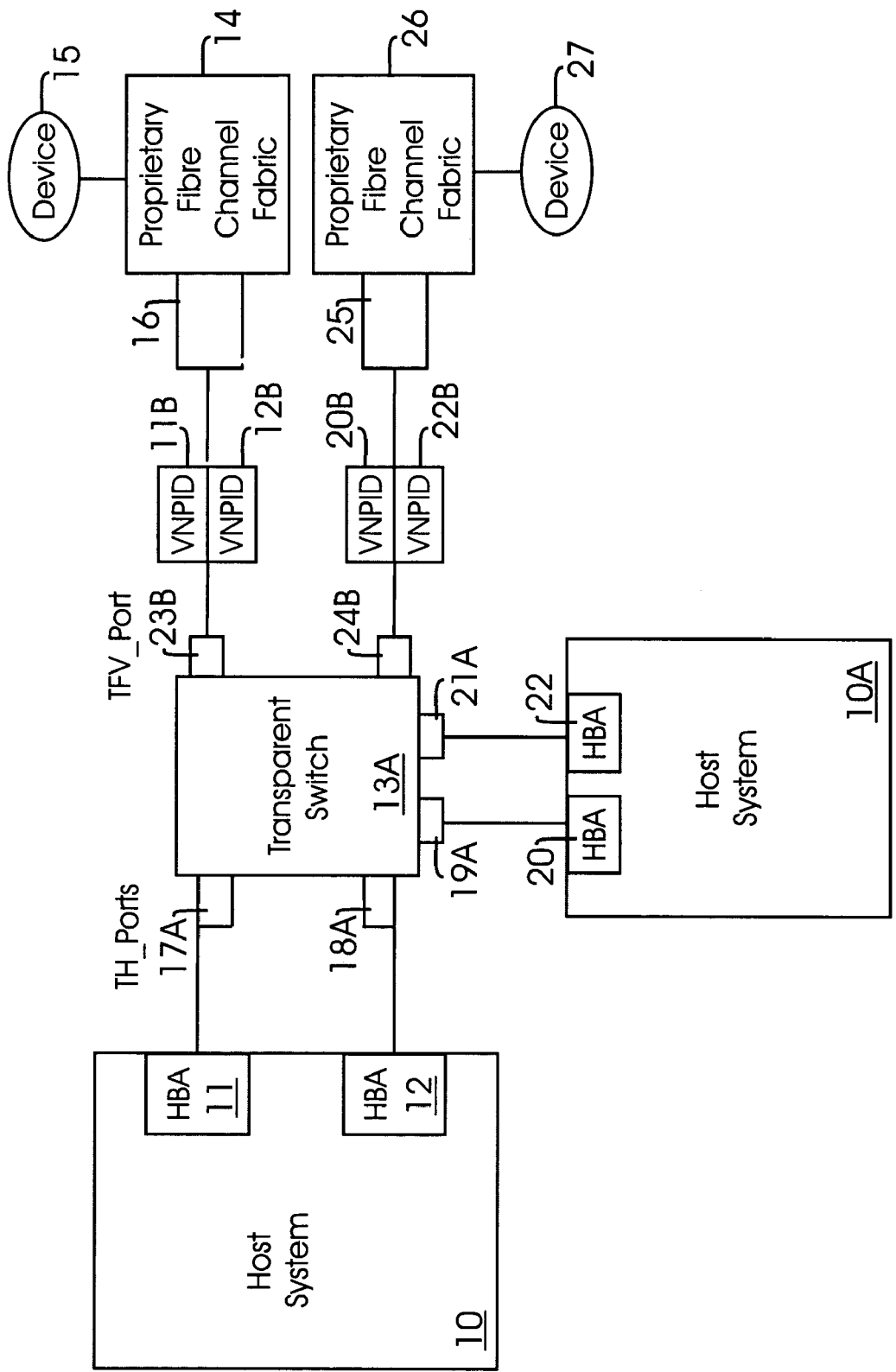

In one aspect of the present invention, TH_Ports and TFV_ports are defined by switch 13A. TFV_ports are shown in FIG. 2C as 23B and 24B. VNPIDS from HBAs 11, 12, 20 and 22 are shown as 11B, 12B, 20B and 22B, respectively. Switch 13A acts as a proxy/bridge for hosts 10 and 10A. TFV_ports request the VNPIDs from hosts 10 and 10A and then place the VNPIDs in alias cache 27A. The values are then used to route frames.

Figure 4:
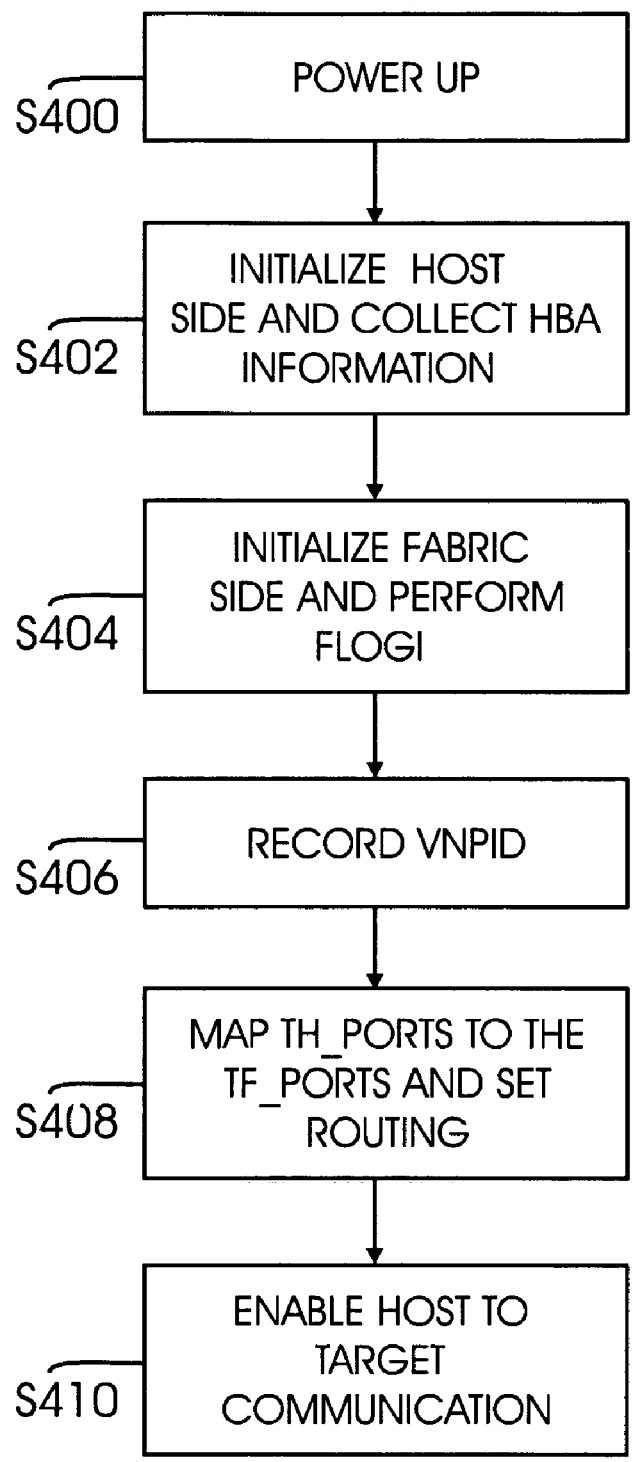

FIG. 4 shows a flow diagram of process steps for using VNPIDs, according to one aspect of the present invention. Turning in detail to FIG. 4, in step S400, switch 13A is powered up. In step S402, TH_Ports are initialized and switch 13A collects WWN information for HBAs 11, 12, 20 and 22. This is acquired during the FLOGI process. After the WWN information is collected, the TH_Ports are taken down (or disabled).

In step S404, switch 13A initializes the TFV_ports as if switch 13A was a host system. TFV_Ports send a FLOGI request to the fabric (i.e. 14 and 15) and then sends FDISC command with the WWPN information for each HBA. This includes a virtual N_Port identifier ("VNPID").

In step S406, TFV_Ports record a new VNPID in alias cache 27A. Each entry is set to a matching TH_port, i.e., each VNPID has a corresponding TH_Port entry.

In step S408, switch 13A maps each of the TH_port to a TFV_Port (for example, port 17A may be mapped to port 23B). Routing module 26A is set so that each TH_port points to a matching TFV_Port.

In step S410, the TH_Ports are re-initialized and the switch responds to the original FLOGI (step S402) with a reserved VNPID that can be allocated. The host PLOGI the Name Server and switch 13A initiates a PLOGI to the fabric switch (14 and/or 26). Switch 13A proxies the Name Server query commands between a TH_port and TFV_port. The change in HBA configuration is registered with switch 13A. Thereafter, host to device communication is enabled.

If a TFV_Port goes down during communication or otherwise, then a matching TH_port is brought down. The TH_Ports are re-assigned to other TFV_Ports and the routing scheme is adjusted accordingly. Based on the re-assignment a new VNPID is assigned to the TH_Ports.

If a TH_Port goes down then the corresponding TFV_port sends a FLOGI for a matching VNPID.

In one aspect of the present invention, Virtual Port ID may be used for allowing communication between hosts and targets and vice versa in a proprietary fabric switch environment.

RAID Expansion:

Redundant array of inexpensive disks ("RAID") configuration can also use the transparent switch 13A, according to one aspect of the present invention. In this configuration a storage controller (or a RAID controller's) target ports are mapped to one or more of fabric side ports. The fabric side port represents an alias of the target ports. Switch 13A multiplexes traffic to the appropriate port by using alias cache entries.

Figure 2D:
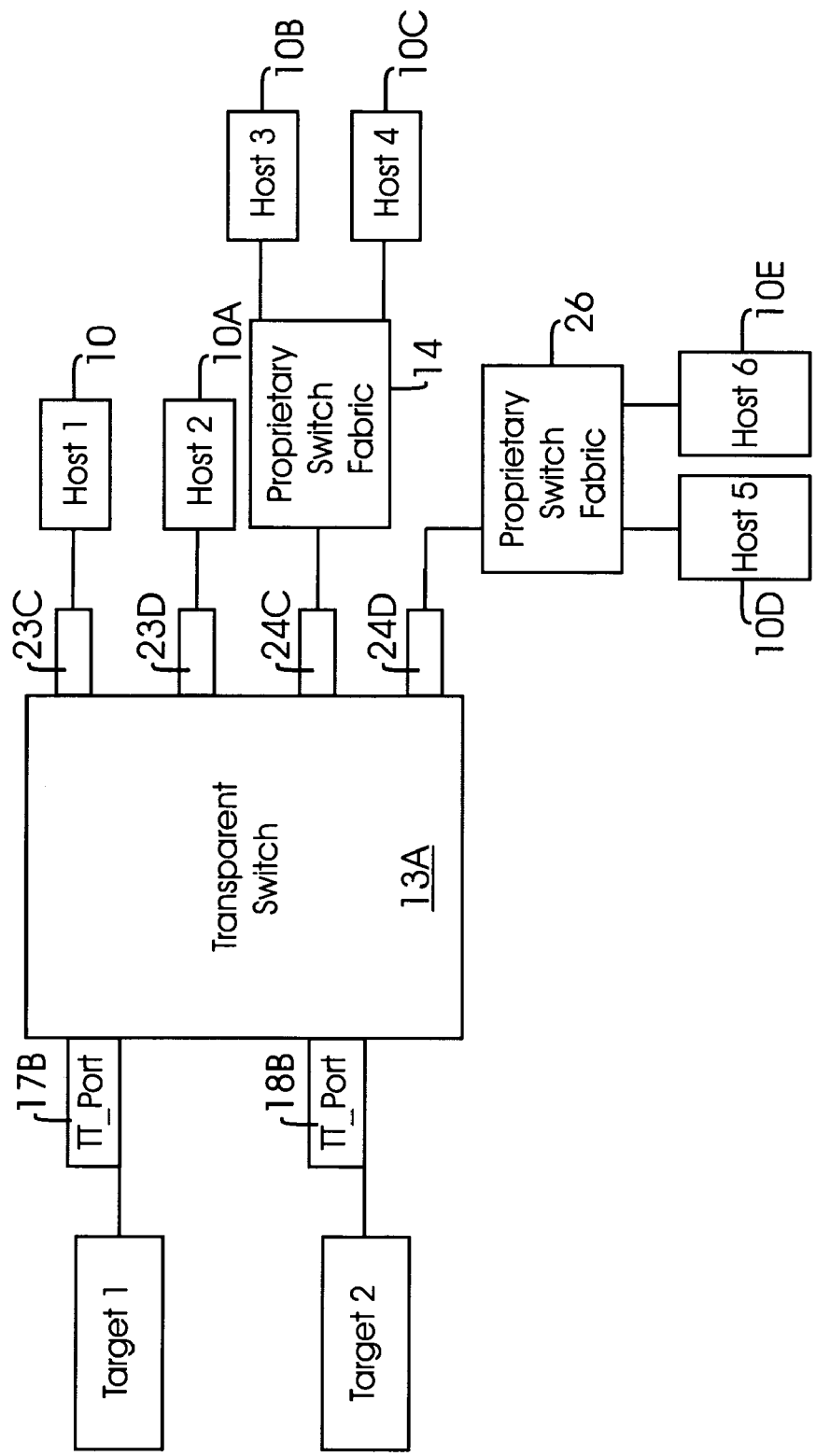

Two novel ports are defined for this configuration, a TT_Port and a TFT_port, according to one aspect of the present invention. In FIG. 2D TT_Ports are shown as 17B and 18B and TFT_Ports are shown as 23C, 23D, 24C and 24D.

Hosts 10 and 10A are coupled to TFT_Ports 23C and 23D respectively. Proprietary fabric switches 14 and 26 are coupled to ports 24C and 24D, respectively. Also, hosts' 10B and 10C are coupled to proprietary switch fabric 14; and hosts 10D and 10E are coupled to proprietary switch fabric 26.

Figure 5:
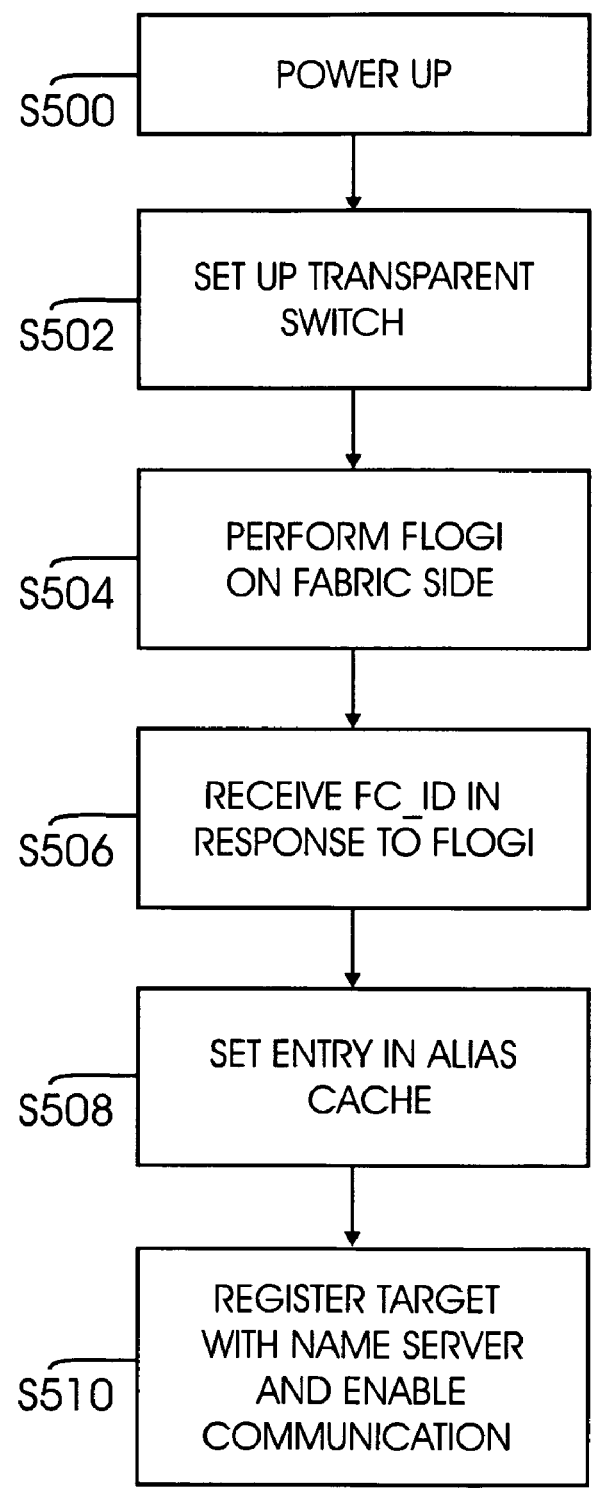

FIG. 5 shows a flow diagram for using transparent switch 13A. In step S500, switch 13A is powered up. In step S502, switch 13A is set up with a defined world wide name ("WWN"). Switch 13A also assigns target ports to the fabric side port and obtains host side WWPN information.

In step S504, switch 13A performs FLOGI on the TFT_Port side. Switch 13A uses the WWPN information to perform the FLOGI. In step S506, switch 13A receives FC_ID in response to the FLOGI.

In step S508, switch 13A sets an entry in alias cache 27A based on the FLOGI information. The FC_ID is matched to the D_ID to point to a corresponding TT_Port. Switch 13A adds an entry in the alias cache 27A of the TT_port to match the new FC_ID in the S_ID. This entry routes frames from TT_Port to the TFT_Port.

In step S510, target 1 and 2 are registered with the Name Server and communication is enabled.

It is noteworthy that the TT_Ports may be addressed by multiple FC_IDs and maintains distinct exchanges for the multiple FC_IDs.

In one aspect of the present invention, a transparent switch allows communication with proprietary switches without loss of functionality.

Although the present invention has been described with reference to specific embodiments, these embodiments are illustrative only and not limiting. Many other applications and embodiments of the present invention will be apparent in light of this disclosure and the following claims.

What is claimed is:

1. A network for communication between a target device operationally coupled to a proprietary switch fabric and a host system, comprising:
   a transparent Fibre Channel switch element that is operationally coupled to the host system and the proprietary switch fabric; and the Fibre Channel switch element's presence is transparent to the proprietary switch fabric when the host system communicates with the target device; and the Fibre Channel switch element includes at least a transparent fabric port and a transparent host port; wherein after the Fibre Channel switch element is powered up, the transparent host port is initialized and the Fibre Channel switch element collects identifier information for a host bus adapter during a fabric login process; and after the identifier information is collected, the transparent host port is disabled; and the transparent fabric port is initialized after the transparent host port is disabled; and the transparent fabric port sends a fabric login request (FLOGI) to the proprietary switch fabric as if the Fibre Channel switch element was the host system; and the transparent fabric port stores virtual N_Port identifier (VNPID) information in an alias cache for routing frames and every entry for a virtual N_Port matches with a corresponding transparent host port.

2. The network of claim 1, wherein the transparent fabric port sends a world wide port number (WWPN) with a virtual N_Port identifier to the proprietary switch fabric after sending a fabric login request.

3. The network of claim 1, wherein the transparent host port is reinitialized after the transparent fabric port is initialized and the Fibre Channel switch element responds to a FLOGI request with a reserved virtual N_Port identifier and initiates a N_Port to N_Port login (PLOGI) procedure with the proprietary switch fabric.

4. The network of claim 1, wherein the Fibre Channel switch element proxies name server commands between the transparent host port and the transparent fabric port.

5. A transparent Fibre Channel switch element for communication between a host system and a target device, the host system operationally coupled to the transparent Fibre Channel switch element and the target device operationally coupled to a proprietary switch fabric, comprising:
   a transparent fabric port that communicates with the target device through the proprietary switch fabric by logging on behalf of the host system such that the proprietary switch operates as if it was communicating directly with the host system; and
   a transparent host port that communicates with the host system via a host bus adapter ("HBA") such that when the host system communicates with the target device the Fibre Channel switch element is transparent to the proprietary switch fabric; wherein after the Fibre Channel switch element is powered up, the transparent host port is initialized and the Fibre Channel switch element collects identifier information for the host bus adapter during a fabric login process; and after the identifier information is collected, the transparent host port is disabled; and the transparent fabric port is initialized after the transparent host port is disabled; and the transparent fabric port sends a fabric login request (FLOGI) to the proprietary switch fabric as if the Fibre Channel switch element was the host system; and the transparent fabric port stores virtual N_Port identifier (VNPID) information in an alias cache for routing frames and every entry for a virtual N_Port matches with a corresponding transparent host port.

6. The Fibre Channel switch element of claim 5, wherein the transparent fabric port sends a world wide port number (WWPN) with a virtual N_Port identifier to the proprietary switch fabric after sending a fabric login request.

7. The Fibre Channel switch element of claim 5, wherein the Fibre Channel switch element proxies name server commands between the transparent host port and the transparent fabric port.

8. The Fibre Channel switch element of claim 5, wherein the transparent host port is reinitialized after the transparent fabric port is initialized and the Fibre Channel switch element responds to a FLOGI request with a reserved virtual N_Port identifier and initiates a N Port login (PLOGI) procedure with the proprietary switch fabric.

9. A method of communication between a host system operationally coupled to a transparent Fibre Channel switch element and a target device that is operationally coupled to a proprietary switch fabric, comprising:

collecting a host bus adapter's ("HBA's") identification information during a fabric login (FLOGI) process after a transparent host port that couples the host system to the Fibre Channel switch element is initialized;

disabling the transparent host port after collecting the HBA identification information; initializing a transparent fabric port that operationally couples the Fibre Channel Switch element to the proprietary switch fabric, after the transparent host port is disabled;

sending a fabric login (FLOGI) procedure request from the transparent fabric port to the proprietary switch fabric as if the Fibre Channel Switch element was the host system; and storing virtual N_Port identifier information in an alias cache for routing frames and every entry for a virtual N_port maps to a corresponding second port;

wherein the Fibre Channel switch element initiates the FLOGI procedure on behalf of the host system.

10. The method of claim 9, wherein the transparent fabric port sends a world wide port number (WWPN) with a virtual N_Port identifier to the proprietary switch fabric after sending a fabric login request.

11. The method of claim 9, wherein the Fibre Channel switch element proxies name server commands between the transparent host port and the transparent fabric port.

12. The method of claim 9, wherein the transparent host port is reinitialized after the transparent fabric port is initialized and the Fibre Channel switch element responds to a FLOGI request with a reserved virtual N_Port identifier and initiates a N_Port to N_Port login (PLOGI) procedure with the proprietary switch fabric.

* * * * *

UNITED STATES PATENT AND TRADEMARK OFFICE
CERTIFICATE OF CORRECTION

PATENT NO. : 7,340,167 B2 Page 1 of 1
APPLICATION NO. : 10/961463
DATED : March 4, 2008
INVENTOR(S) : Edward C McGlaughlin It is certified that error appears in the above-identified patent and that said Letters Patent is hereby corrected as shown below:

In column 11, line 9, in claim 8, delete "N Port login" and insert -- N_Port to N_Port login --, therefor.

Signed and Sealed this

Second Day of November, 2010

David J. Kappos
*Director of the United States Patent and Trademark Office*